(12) United States Patent
Merchant et al.

(10) Patent No.: US 7,043,621 B2
(45) Date of Patent: May 9, 2006

(54) SHARDING METHOD AND APPARATUS USING DIRECTED GRAPHS

(75) Inventors: Arif Merchant, Los Altos, CA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 10/439,977

(22) Filed: May 15, 2003

(65) Prior Publication Data

US 2004/0230764 A1 Nov. 18, 2004

(51) Int. Cl.
*G06F 12/00* (2006.01)
(52) U.S. Cl. .................................. 711/173; 707/205
(58) Field of Classification Search .................... None
See application file for complete search history.

(56) References Cited

U.S. PATENT DOCUMENTS 5,200,888 A * 4/1993 Hashimoto ............... 700/90
5,729,671 A * 3/1998 Peterson et al. ........... 345/423
5,897,661 A * 4/1999 Baranovsky et al. ....... 711/170
6,076,143 A * 6/2000 Blumenau .................. 711/114
6,327,592 B1 * 12/2001 Yoshikawa ................ 707/101

OTHER PUBLICATIONS

Y.C. Chehadeh, et al, Application of Parallel Disks For Efficient Handling Of Object-Oriented Databases, Proceedings of the 5th symposium, IEEE, 1993, Los Alamitos, CA.
Duen-Ren Lu, et al, Partitioning Similarity Graphs: A Framework For Declustering Problems, Information Systems, Pergamon Press, vol. 21 No. 6, 1996, Oxford, UK.

* cited by examiner

Primary Examiner—Mano Padmanabhan
Assistant Examiner—Daniel Ko
(74) Attorney, Agent, or Firm—Richard P. Lange

(57) ABSTRACT

A method and apparatus is used to divide a storage volume into shards. The division is made using a directed graph having a vertex for each block in the storage volume and directed-edges between pairs of vertices representing a shard of blocks, associating a weight with each directed edge that represents the dissimilarity for the shard of blocks between the corresponding pair of vertices, selecting a maximum number of shards (K) for dividing the storage volume, identifying a minimum aggregate weight associated with a current vertex for a combination of no more than K shards, performing the identification of the minimum aggregate weight for vertices in the directed graph, and picking the smallest aggregated weight associated with the last vertex to determine a sharding that spans the storage volume and provides a minimal dissimilarity among no more than K shards of blocks.

20 Claims, 9 Drawing Sheets

SHARDING METHOD AND APPARATUS USING DIRECTED GRAPHS

BACKGROUND OF THE INVENTION

The present disclosure relates to the organization of storage systems and improving storage performance characteristics.

Modern storage systems often use a storage volume to organize and manage information. The storage volume is a logical entity representing a virtual container for data or an amount of space reserved for data. While a storage volume can be stored on a device, they do not necessarily represent a single device. Typically, one or more portions of a storage volume are mapped to one or more physical devices. In many cases, these mappings can be fairly arbitrary and a device may contain parts if not all of several storage volumes. Likewise, a storage volume may be mapped to several devices. The Logical Volume Manager (LVM) is a tool used to manage the storage volumes on a system.

Increasing the homogeneity of information being stored on the storage volume can have many benefits. Computer systems accessing data frequently may experience better performance when the "hot data" is stored in a storage volume having faster access characteristics. Similarly, there may be little performance impact by grouping less frequented data or "cold data" on slower storage volumes that do not require the more expensive fast access features. Increasing the homogeneity of data also improves the ability to predict performance and deploy storage devices and hardware that better match the required performance needs.

Conventional systems rely on administrators to identify homogeneous information and then distribute it on one more storage volumes. Upon system setup, a person can initially allocate one drive to hold frequently accessed information and the second drive or storage volume to hold less frequently accessed information. Unfortunately, it is difficult and cumbersome to maintain this type of arrangement manually and keep the homogeneous data together. Not only is it difficult for administrators to identify data which is "similar", but also over time, initial allocations of data may grow too large for the particular storage volume and/or different access patterns may emerge as usage behavior changes or are modified; this makes it impossible to estimate the mapping statically. Dividing groups of homogenous information onto distinct physical storage volumes manually is inflexible and not likely to be effective over any useful period of time.

Another approach is to automatically divide a storage volume into shards of homogenous data. The shard is a portion of the storage volume used to logically group together information having homogenous access characteristics. Different sharding combinations are used depending on the storage volume and access characteristics of the underlying data. Over time, different sharding combinations can be used to accommodate changing access patterns and make the data stored on a storage volume more homogeneous.

Identifying access patterns and homogenous data for the shard is difficult as two or more underlying data sets are rarely identical. In most cases, the access pattern for one block of data may be similar but not identical to another block of data. A pair wise similarity metric provides one method of grouping blocks of data together in a homogeneous shard. There are many other ways of detecting if one or more blocks are similar or dissimilar in nature to each other.

Unfortunately, there are many different possible divisions of the storage volumes into shards. Some divisions produce shards with more homogeneous access patterns than others. Currently, there is no effective and efficient method for determining an optimal sharding that provides the set of shards with the most homogeneous access patterns. It is both time consuming and processor intensive to consider every possible sharding of a storage volume.

BRIEF DESCRIPTION OF THE DRAWINGS

Like reference numbers and designations in the various drawings indicate like elements.

SUMMARY OF THE INVENTION

One aspect of the present invention maps shards to a directed graph for analysis. This mapping includes identifying potential shards in the storage volume, creating vertices and directed edges between pairs of the vertices in the directed graph for each potential shard in the storage volume, associating a weight to each directed edge to represent the dissimilarity of the sequence of blocks corresponding to the directed edge.

Another aspect of the present invention divides a storage volume into shards using the directed graph. The dividing includes creating a directed graph having a vertex corresponding to each block in the storage volume and directed edges between pairs of vertices representing a shard of blocks, associating a weight with each directed edge that represents the dissimilarity for the shard of blocks between the corresponding pair of vertices, selecting a maximum number of shards (K) for dividing the storage volume, identifying a minimum aggregate weight associated with a current vertex for a combination of no more than K shards, performing the identification of the minimum aggregate weight for all vertices in the directed graph, and picking the smallest aggregated weight associated with the last vertex to determine a sharding that spans the storage volume and provides a minimal dissimilarity among no more than K shards of blocks.

The details of one or more embodiments of the invention are set forth in the accompanying drawings and the description below. Other features and advantages of the invention will become apparent from the description, the drawings, and the claims.

DETAILED DESCRIPTION

Aspects of the present invention are advantageous in at least one or more of the following ways. Dividing a storage volume into shards can improve access characteristics and performance when the shards correspond to relatively homogeneous groups of blocks. To reduce the complexity of this calculation, the blocks in the storage volume and potential shards are mapped to a directed graph for analysis as a shortest path problem.

A storage volume with many different potential shardings is analyzed more rapidly by the reuse of calculations made on neighboring vertices in the directed graph. Keeping track of and minimizing the total dissimilarity between a set of shardings eventually yields the optimal division of the storage volume into shards.

Figure 1:
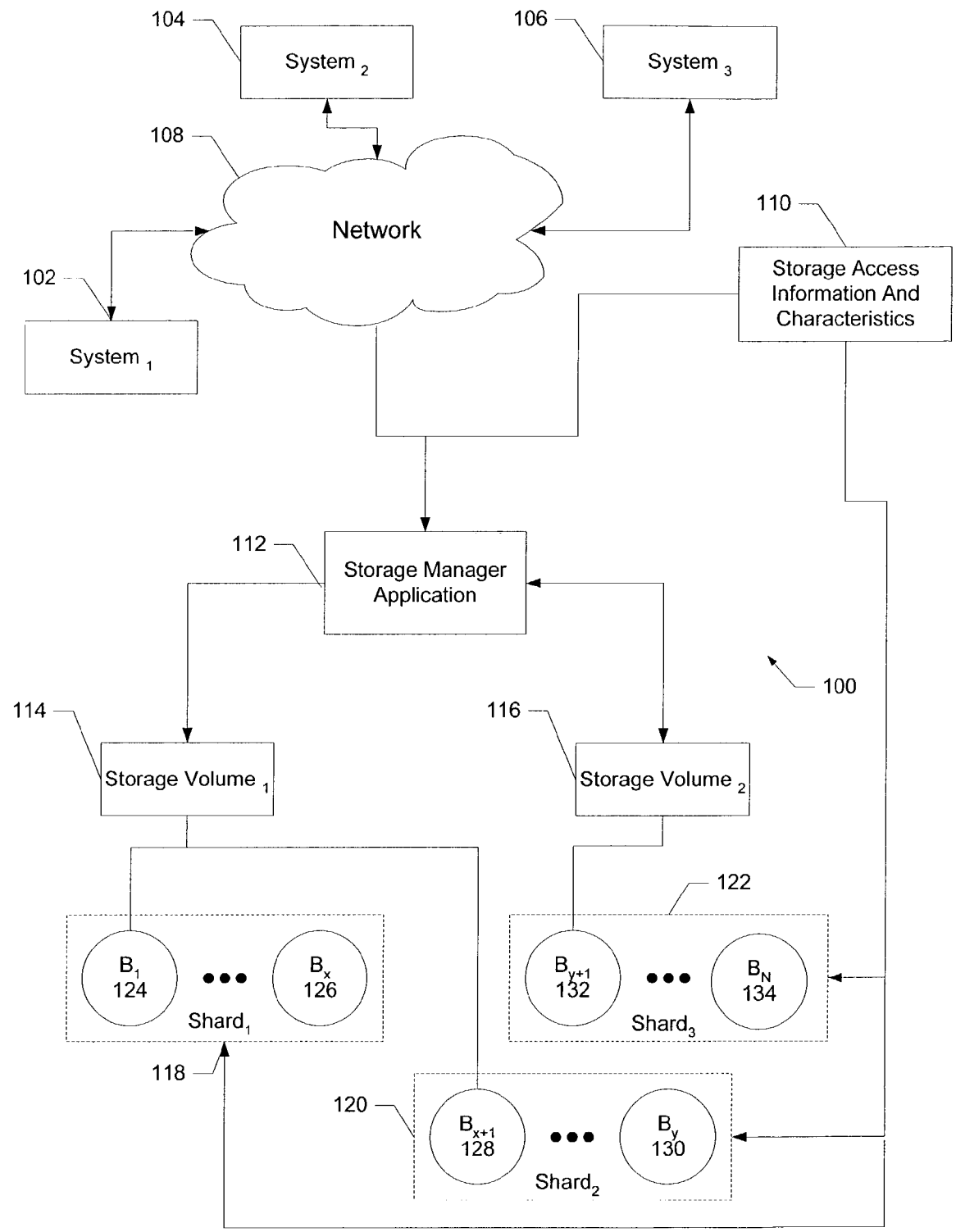
FIG. 1 is a block diagram representation of a system using storage volumes divided into shards.

FIG. 1 is a block diagram representation of a system using storage volumes divided into shards. System 100 includes $system_1$ 102, $system_2$ 104, and $system_3$ 106 accessing storage manager application 112 over network 108. Storage manager 112 manages storage $volume_1$ 114, having $shard_1$ 118 and $shard_2$ 120, and storage $volume_2$ 116 having $shard_3$ 122. $Shard_1$ 118 consists of blocks 124 through 126, $shard_2$ 120 consists of blocks 128 through 130 and $shard_3$ 122 consists of blocks 132 through 134. Accordingly, each storage volume may be divided into one or more shards wherein each shard consists of one or more blocks.

In one implementation, each $system_1$ 102, $system_2$ 104, and $system_3$ 106 access storage through storage manager 112 and network 108 as illustrated in FIG. 1. Storage manager 112 contains logic in accordance with the present invention for determining the optimal division of each storage volume into shards. Alternate implementations operating without storage manager 112 instead include similar logic directly in each $system_1$ 102, $system_2$ 104, and $system_3$ 106 or more directly associated with storage $volume_1$ 114 and storage $volume_2$ 116. Distributed solutions generate an optimal sharding in accordance with the present invention by distributing the processing over a combination of one or more systems 102, 104 and 106, storage manager application 112, and potentially on-board logic on storage volumes 114 and 116.

In operation, implementations of the present invention gather storage access information and characteristics 110 on the various storage volumes in the system which generally includes recording I/O activity in a storage space having multiple storage volumes. For example, I/O activity may include determining a number of I/O operations in a particular storage area, the rate of the I/O operations over a period of time, the ratio of reads to writes, the locality of I/O activity, burstiness of the access, and many other characteristics. These characteristics are taken into account along with other storage measurements to determine a homogeneity within one or more storage volumes. The homogeneity information can be used to predict the future usage of a storage device and cluster together blocks into shards for improved access and performance.

In one implementation, storage manager application 112 uses a dissimilarity function that measures the pair wise differences of blocks in the storage volumes. This dissimilarity function is used to determine the statistical homogeneity of one or more storage volumes. Implementations of the present invention then use the dissimilarity results to divide the storage volumes 114 and 116 into three shards: $shard_1$ 118 consisting of blocks 124 through 126, $shard_2$ 120 consisting of blocks 128 through 130 and $shard_3$ 122 consisting of blocks 132 through 134. As previously described clustering homogenous portions of the storage volumes into one or more shards better matches the access characteristics to the devices thereby improving performance and manageability of the storage systems. For example, frequently accessed storage space can be put on "hot" shards having faster underlying storage devices while more infrequently storage space can be relegated to "cooler" shards running on less performance oriented storage devices. The dissimilarity function are described later herein and further described in co-pending U.S. patent application entitled, "A Method and Apparatus for Measuring and Optimizing Spatial Segmentation of Electronic Workloads" by R. Becker-Szendy and Arif Merchant, Ser. No. 09/058,185 assigned to the assignee of the present invention and herein incorporated by reference in the entirety.

Figure 2:
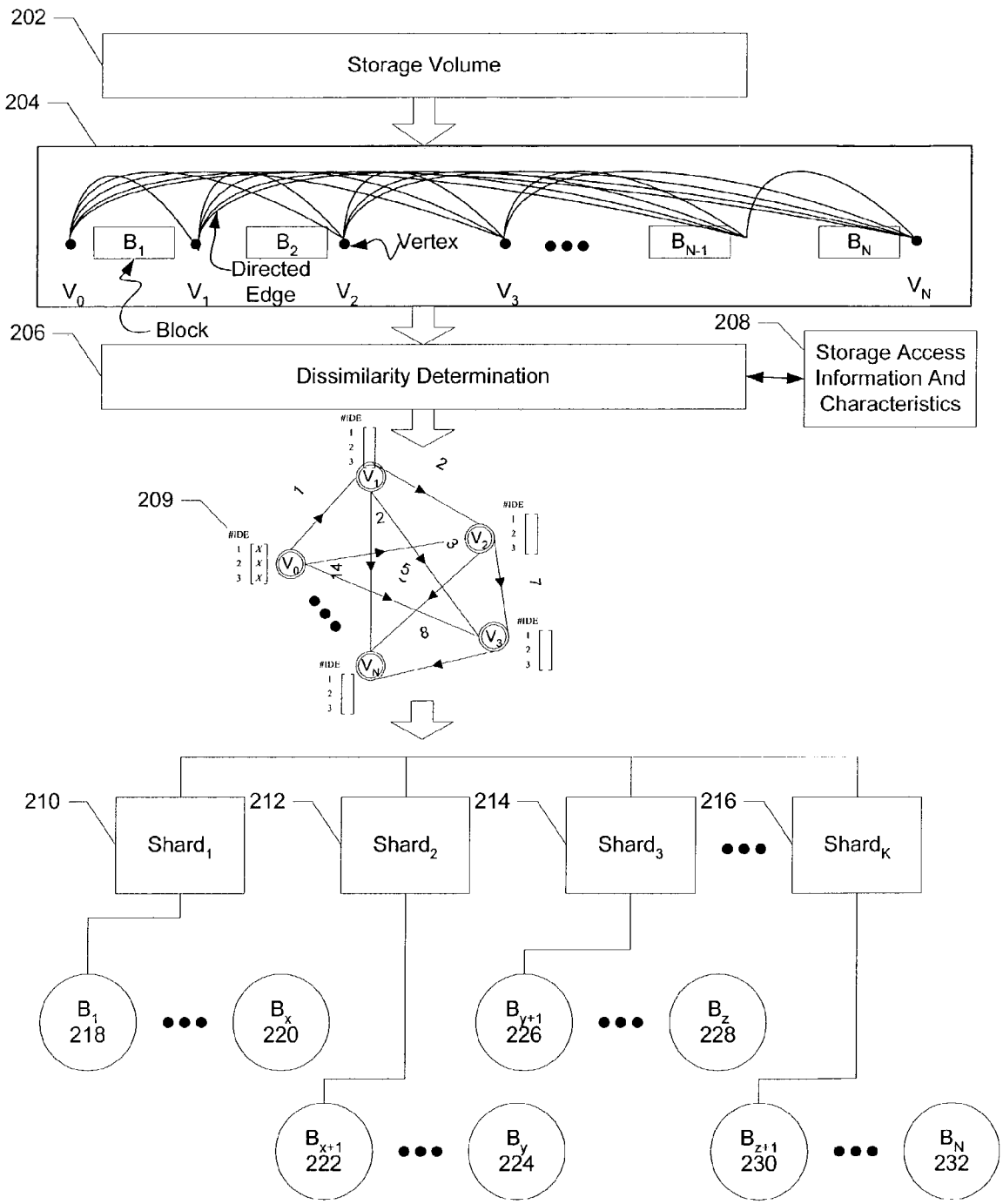
FIG. 2 is a block diagram schematic mapping the relationship between a storage volume and the distribution of blocks into shards associated with a storage volume in accordance with one implementation of the present invention.

FIG. 2 is a block diagram schematic mapping the relationship between a storage volume and the distribution of blocks into shards associated with a storage volume in accordance with one implementation of the present invention. Storage volume 202 can be one of many storage spaces being organized into optimal shards for improved performance. Internally, storage volume 202 can be represented as a series of blocks 204 or other logical division of N storage units. Implementations of the present invention create N+1 vertices corresponding to the N blocks in series of blocks 204. A directed edge is created corresponding to different pairs of vertices between $V_0$ and $V_N$ as illustrated in series of blocks 204. An edge between two vertices $V_i$ and $V_j$ will be used to denote a shard containing blocks $B_{i+1}$ through $B_j$. These vertices and edges are used to create a directed graph 209 as illustrated and described later herein.

As these N blocks ($B_1$ through $B_N$) are accessed, information is collected and gathered in storage access information and characteristics 208. Since a storage volume is a sequence of blocks, the relationship between blocks and the storage volume can be represented as:

Storage Volume=($Block_1$, $Block_2$, ... $Block_N$)

For purpose of the present invention, the storage volume and blocks contained in the storage volume can also be represented as a cluster of blocks. A given shard can be represented using the following notation emphasizing the range of blocks associated with the storage volume from i to j:

$Shard_{ij}$=($Block_{i+1}$, ..., $Block_j$)

Where:

$Block_{i+1}$=first block in the shard $Block_j$=last block in the shard

A dissimilarity determination component 206 processes storage access information and characteristics 208 to determine the pair-wise dissimilarity between the N blocks being analyzed. In one implementation, dissimilarity can be represented using a range from 0 to 1 or greater, where 0 indicates no dissimilarity and 1 or greater indicates a high dissimilarity. The dissimilarity for a particular shard can be computed as the sum of the dissimilarity between two or more blocks contained within the shard. Formally, the dissimilarity for a given shard containing block i through block j can be represented as:

$$\text{Dissimilarity}(Shard_{i,j}) = \sum_{p=i+1}^{j} \sum_{q=p+1}^{j} \text{dissimilarity}(Block_p, Block_q)$$

Where:

$Block_{i+1}$=first block in the shard $Block_j$=last block in the shard 0 or small value~little dissimilarity If it is desired, the dissimilarity of a shard can be alternatively derived from a measure of the pair-wise similarity between the blocks in the shard. To convert from the block similarity function to the shard dissimilarity function, the following relationship can be used:

$$\text{dissimilarity}(shard_{i,j}) = \sum_{p=i+1}^{j} \sum_{q=p+1}^{j} (1 - \text{similarity}(block_p, block_q))$$

Where:

$block_{i+1}$=first block in the shard $block_j$=last block in the shard

In general, implementations of the present invention can be used with many different dissimilarity functions and dissimilarity determination component 206 is not limited to only working with the dissimilarity functions described herein. It is important that implementations of the present invention select a dissimilarity function to create an optimal sharding that groups blocks together having the smallest dissimilarities. In one example, the dissimilarity function monitors storage access activity in an area of storage space being gathered in storage access information and characteristics 208. The monitoring information/results are then used to measure at least one characteristic of the storage access activity in one or more individual portions of the storage space according to a predetermined parameter. Dissimilarity is then determined based upon whether the characteristic of storage access activity of one individual portion is dissimilar to that of another portion according to predetermined criteria. As needed, dissimilarity is computed as the complement of the similarity function as previously described.

The predetermined parameter and criteria used to determine similarity in this example can be based upon one or more of the following, alone or in combination. For example, similarity can be determined by comparing the I/O size measurement of different portions of the storage volume, comparing the I/O size measurement of the each portion, comparing the read/write ratio of the each portion, and comparing the I/O density of the each portion while monitoring the characteristic of storage access activity of these storage volumes. Further details on one similarity function compatible with implementations of the present invention is described in further detail in, "A Method and Apparatus for Measuring and Optimizing Spatial Segmentation of Electronic Workloads" by R. Becker-Szendy and Arif Merchant.

Directed graph 209 illustrates a portion of the edges and vertices corresponding series of blocks 204 are used to generate directed graph 209. Many of the edges and vertices are omitted from directed graph 209 to better illustrate the details and weight vectors used in accordance with the present invention. In this example, directed graph 209 includes vertices $V_0$, $V_1$, $V_2$, $V_3$ and $V_4$ and a number of edges between the vertices. Weights are associated with the edges based on the dissimilarity determination 206 and used to fill weight vectors associated with each vertex of directed graph 209. Analysis of directed graph 209 is described further later herein.

After analyzing directed graph 209, implementations of the present invention determine the optimal sharding or clustering of blocks for each of the storage volumes. Referring to FIG. 2, storage volume 202 is divided into four shards: $shard_1$ 210 into blocks 218 through 220, $shard_2$ 212 (blocks 222 through 224), $shard_3$ 214 (blocks 226 through 228), and $shard_4$ 216 (blocks 230 through 232).

Implementations of the present invention use a directed graph to represent all the potential shardings of the storage volume and from that select the optimal combination of shardings for the storage space. The person performing the sharding operation limits the number of shards (K) that the storage volumes are divided into depending on one or more characteristics of the available storage devices. For example, the number of shards may be limited to K=6 because there are 6 different storage devices each having relatively different operating characteristics within the storage space.

Implementations of the present invention select a sharding both accurately and efficiently by converting the sharding problem into a shortest path problem for the directed graph. As an added constraint, the total storage volume is divided into no more than K different shards. This additional constraint limits the search along K or fewer edges of the directed graph and ensures the solution to produce a sharding of K or fewer shards for the storage space.

Figure 3:
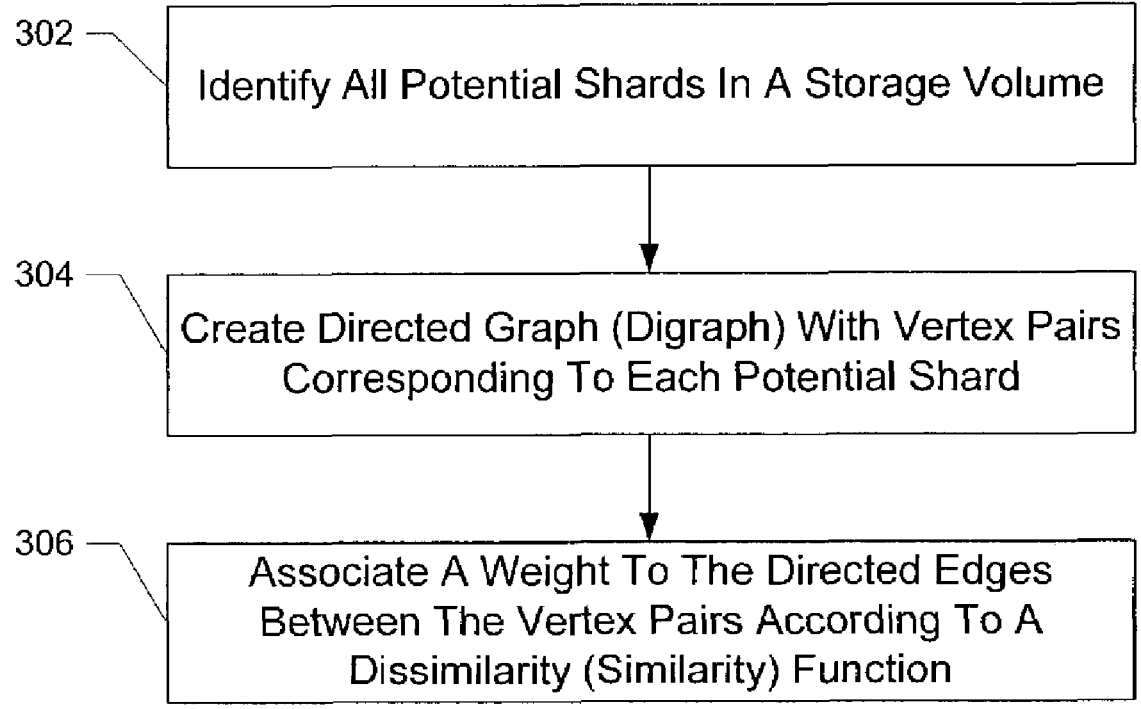
FIG. 3 is a flow chart diagram providing the operations associated with mapping a storage volume as a directed graph in accordance with implementations of the present invention.

FIG. 3 is a flow chart diagram providing the operations associated with mapping a storage volume as a directed graph in accordance with implementations of the present invention. Mapping shards in a storage volume to a directed graph first requires identifying all potential shards in the storage volume (302). Processing a large storage volume with a large number of blocks can result in many different potential sharding combinations. Potential shards in the storage volume correspond to the various pair wise sequence of blocks spanning the storage volume. The various sharding combinations are later analyzed by implementations of the present invention to determine the optimal sharding of the storage volume or volumes.

A vertex pair in the directed graph corresponds to a potential sharding (304); that is, each vertex pair corresponds to the sequence of blocks between a pair of vertices. For example, a vertex pair ($V_0$, $V_5$) corresponds to a shard containing the sequence of blocks including $block_1$, $block_2$, $block_3$, $block_4$, and $block_5$.

In addition, a directed edge is created between each vertex pair and a weight is associated with it; the weight represents the dissimilarity of the sequence of blocks between the vertex pair (306). In one implementation, the directed edge is directed from lower to higher blocks of addresses and corresponds to increasing vertex addresses in the directed graph. No back edges exist as each edge represents a shard starting at the lower address and ending at the higher address. For example, a forward edge may exist between vertices $V_0$ and $V_5$, but no edge exists going from vertex $V_5$ to vertex $V_0$. The resulting directed graph having vertex pairs for each potential sharding and weights along the directed edge between the vertices provides a context for analyzing a storage volume efficiently and accurately in accordance with implementations of the present invention.

Figure 4:
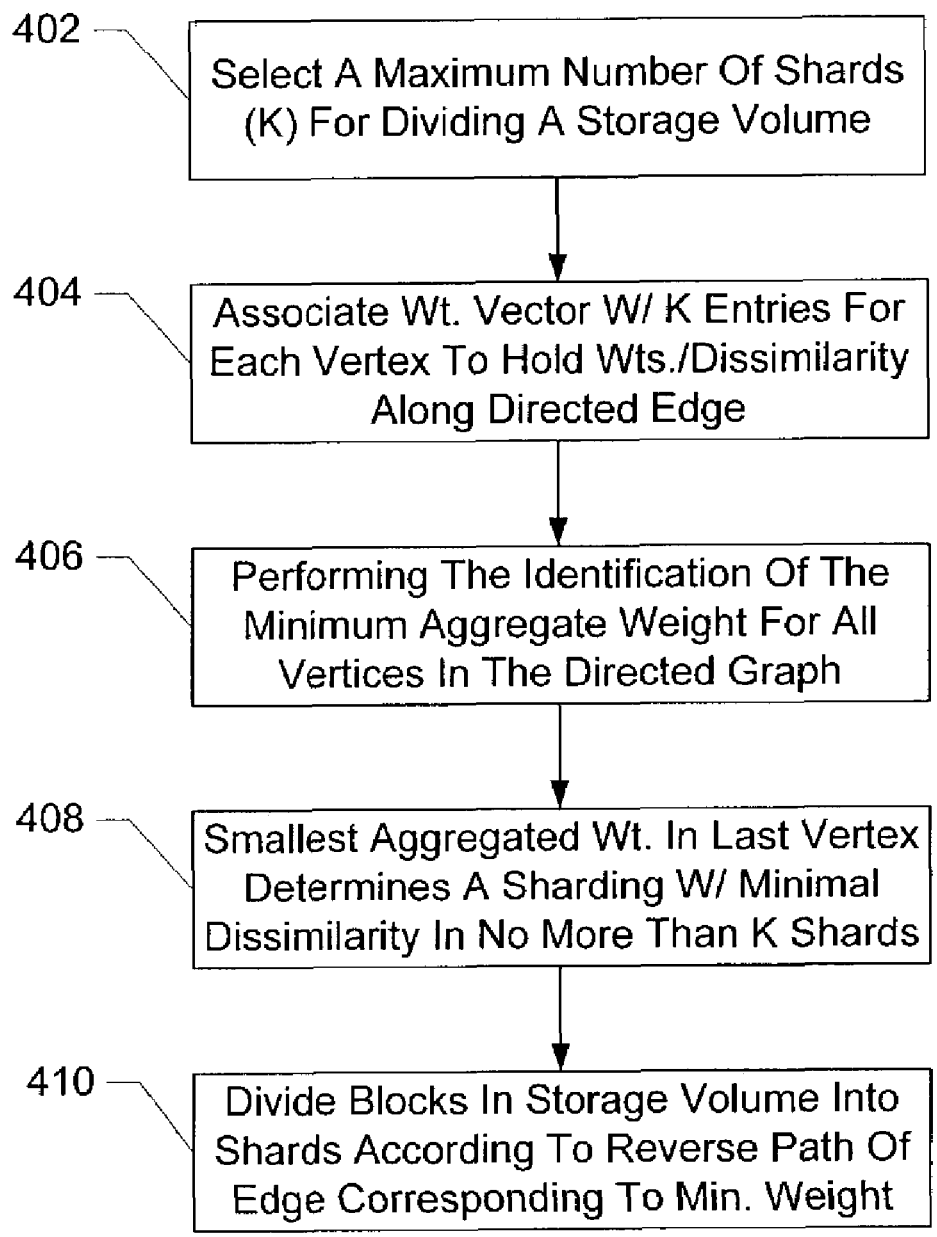
FIG. 4 is a flow chart diagram providing the operations to determine an optimal sharding using a directed graph representing the potential shardings of a storage volume in accordance with one implementation of the present invention.

FIG. 4 is a flow chart diagram providing the operations to determine an optimal sharding using a directed graph representing the potential shardings of a storage volume in accordance with one implementation of the present invention. Before analysis begins, it is assumed the directed graph described previously has been created having a vertex for each block in the storage volume and directed-edges between pairs of vertices representing a shard of blocks. A weight is associated with each directed edge representing the dissimilarity for the shard of blocks between the corresponding pair of vertices.

Initially, a user or system designer selects a maximum number of shards (K) for dividing the storage volume (402). As previously described, the maximum number of shards is generally set according to some physical or logical characteristic associated with the storage volume and well-known to the person designing or building the storage system. The maximum number of shards (K) is set as a not-to-exceed maximum so the present invention explores each combination of K or fewer shards and determines which provides the most optimal combination. Depending on the dissimilarity measurements made within each shard, it is possible that a combination of fewer than K shards represents a more optimal division of a storage volume than the possible when using the maximum number of K shards. For example, one implementation of the present invention may determine that a storage volume is more optimally divided into 3 shards than 6 shards even though the maximum number of shards is K=8.

A weight vector is associated with each vertex in the directed graph to hold aggregate weights from the K or fewer directed edge (404). Each vertex in the directed graph is analyzed in sequence to identify the least dissimilar sharding of blocks up to that vertex into K or fewer shards. For the current vertex, the present invention identifies a minimum aggregate weight associated with a combination of i shards (406), where 0<i<K+1. The aggregate weight is calculated by adding the weights associated with the directed edge, to the previously calculated weights of the other vertices. The minimum aggregate weight identified in the current vertex represents the combination of shards thus far with the smallest dissimilarity. In a storage volume having many blocks and shard combinations, this aggregate weight calculation can be complex so implementations of the present invention rely on neighboring vertices to determine the minimum aggregated weight rather than calculate this amount in the entirety for each vertex. This greatly simplifies processing the many different sharding combinations and is described in further detail below in conjunction with FIG. 5.

Eventually, identification of the minimum aggregate weight is performed by implementations of the present invention for all vertices in the directed graph. In effect, processing done on the information from each vertex determines the shard or shards with the least dissimilarity to that point in the directed graph. The last vertex in the directed graph is used to determine the optimal sharding of the storage volume into K or fewer shards. Accordingly, picking the smallest aggregated weight associated with the last vertex determines a sharding that spans the storage volume and provides a minimal dissimilarity among no more than K shards of blocks (408). This reverse path of directed edges corresponding to this minimum weight is used to divide the blocks in the storage volume into an optimal sharding (410). No more than K directed edges are used thus limiting the division of the storage volume into no more than K shards.

Figure 5:
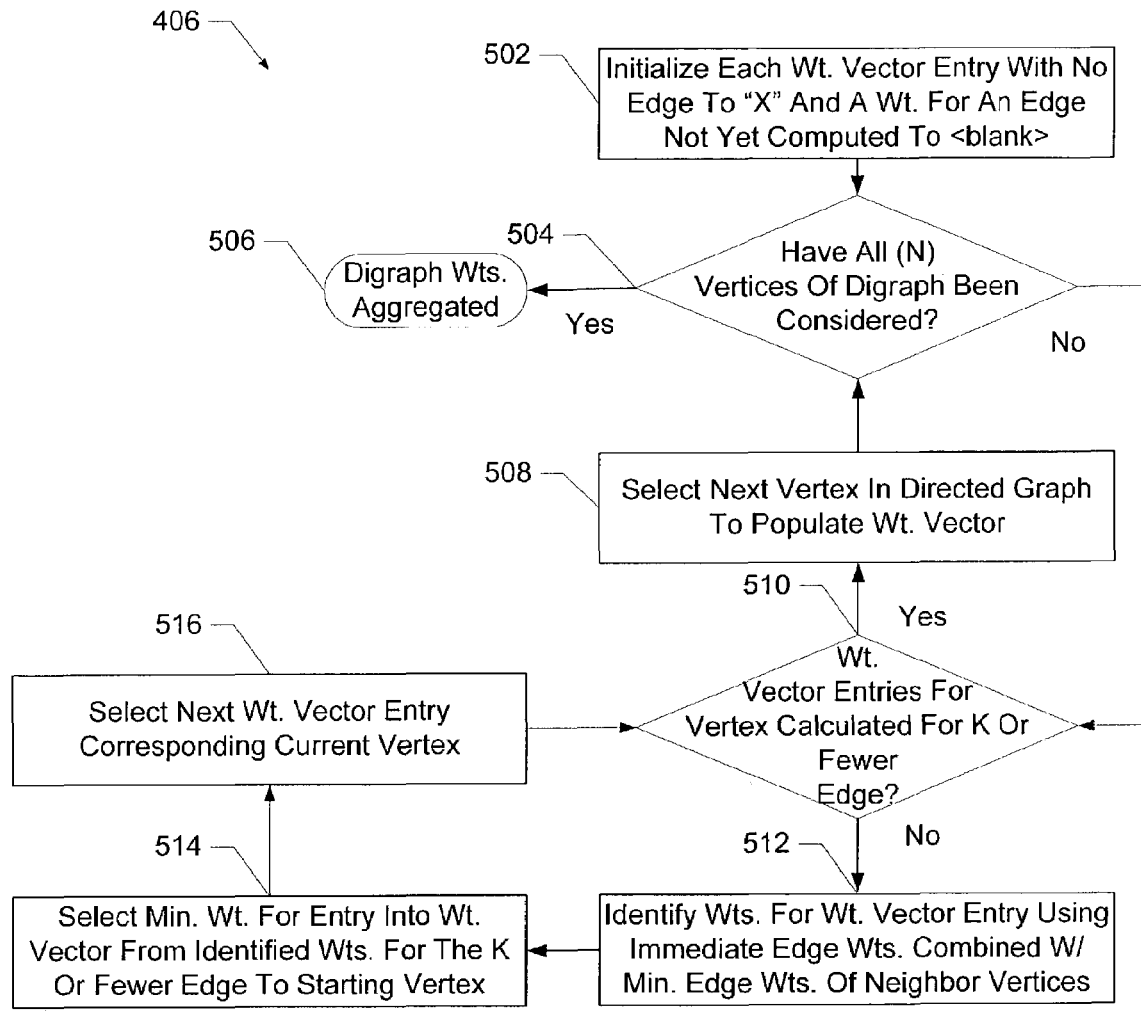
FIG. 5 provides a flow chart diagram in accordance with one implementation of the present invention of the operations to efficiently determine a minimal weight for a directed graph representing potential shards in a storage volume.

FIG. 5 provides a flow chart diagram in accordance with one implementation of the present invention of the operations to efficiently determine a minimal weight for a directed graph representing potential shards in a storage volume. Operations in FIG. 5 further detail step 406 in FIG. 4 and describe one implementation of determining a minimum aggregate weight for the vertices being analyzed in the directed graph. As previously described, a weight vector is associated with each vertex in the directed graph to hold aggregate weights from the K or fewer directed edge. The weight vector can be a 1-dimensional vector with K entries corresponding to the maximum number of shards for dividing the storage volume. For example, a maximum shard of K=3 determines that each vertex in the direct graph has a weight vector with 3 entries.

The $K^{th}$ weight vector entry for each vertex is initialized to an "X" if there is not a sequence of at least K directed edges to the current vertex; the $K^{th}$ weight vector entry is initialized to a blank value when there may be a sequence of at least K directed edges to the current vertex but they have not yet been calculated (502). In general, all entries in the weight vector for the first vertex in the directed graph are always initialized to "X" entries because there are no directed edges to the first vertex. Similarly, if K=3, the $2^{nd}$ and $3^{rd}$ entries in the weight vector for the second vertex are initialized to "X" and the first entry is initially blank. In this latter case, only the first entry in the weight vector for the second vertex has a weight value that needs calculation as there is only one directed edge to the second vertex.

In each iteration a check is made to determine if all vertices of the directed graph have been considered and processed (504). Once all the vertices have been visited and processed, the optimal sharding is determined by inspecting the weight vector for the last vertex of the directed graph as previously described and the processing is complete (506). Otherwise, each vertex is selected in an ascending sequential order and the K corresponding weight vector entries are populated in accordance with the present invention (508).

For a current vertex, immediate directed edge weights are combined with the minimum directed edge weights of neighbor vertices to identify the $K^{th}$ weight vector entry (510). Values in the weight vector of neighbor vertices are used instead of recalculating weights for all directed edges between the current vertex and the first vertex in the directed graph. This shortcut technique both reduces processing load and save time as the minimal weights (i.e., minimum dissimilarity) between vertices is determined incrementally and reused.

In some cases, there are multiple combinations of weights associated with the directed edges that may be entered into a weight vector entry of the current vertex (512). If this occurs, implementations of the present invention select the minimum weight among the combinations and enter it into the weight vector for the current vertex (514). Ensuring only the minimum weights are stored in the weight vector for each of the K entries enables subsequent vertices to use this neighboring information and expedite processing. Once a weight vector is populated, the next vertex in the directed graph is selected and processing continues (516).

The operations associated with processing the directed graph representation of sharding a storage volume can also be represented with pseudo-code as provided below:

```
Procedure Optimal Sharding (D,K)
Input: Digraph D and length bound K
    0: Set W₀[j] = "X" "crossed-out" and Wᵢ[k] = blank for each 1 ≤ i ≤ N and 1 ≤ k ≤ K
    1: For each 1 ≤ i ≤ N do
        for each 1 ≤ k ≤ K do
            pick the neighbors of M of Vᵢ incoming directed edges to Vᵢ
            if Wᵤ[k - 1] is crossed out for all neighbors Vᵤ ∈ M
                then set Wᵢ[k] = crossed-out
                else set Wᵢ[k] = min_{vᵤ∈M}(Wᵤ[k - 1] + dᵤᵢ)
    2: Pick the smallest weight from W_N[1 . . . K] and return corresponding dipath
```

Where:

W is a K-dimensional weight vector with min. weight entries associated with a vertex V K is the maximum number of shards for dividing the storage volume N is the maximum number of blocks in the storage volume U is the set of neighboring vertices also having entries in a weight vector W $d_{ui}$ is the minimum distance for the vertex V FIG. 6A through 6E are schematic diagrams of a directed graph representing various shards in a storage volume and processed in accordance with implementations of the present invention. This example directed graph may have fewer vertices and directed edges compared with other storage applications to help clarify aspects of the present invention however the same or similar principles provided would also apply to much larger and complex storage volumes as well.

Figure 6A:
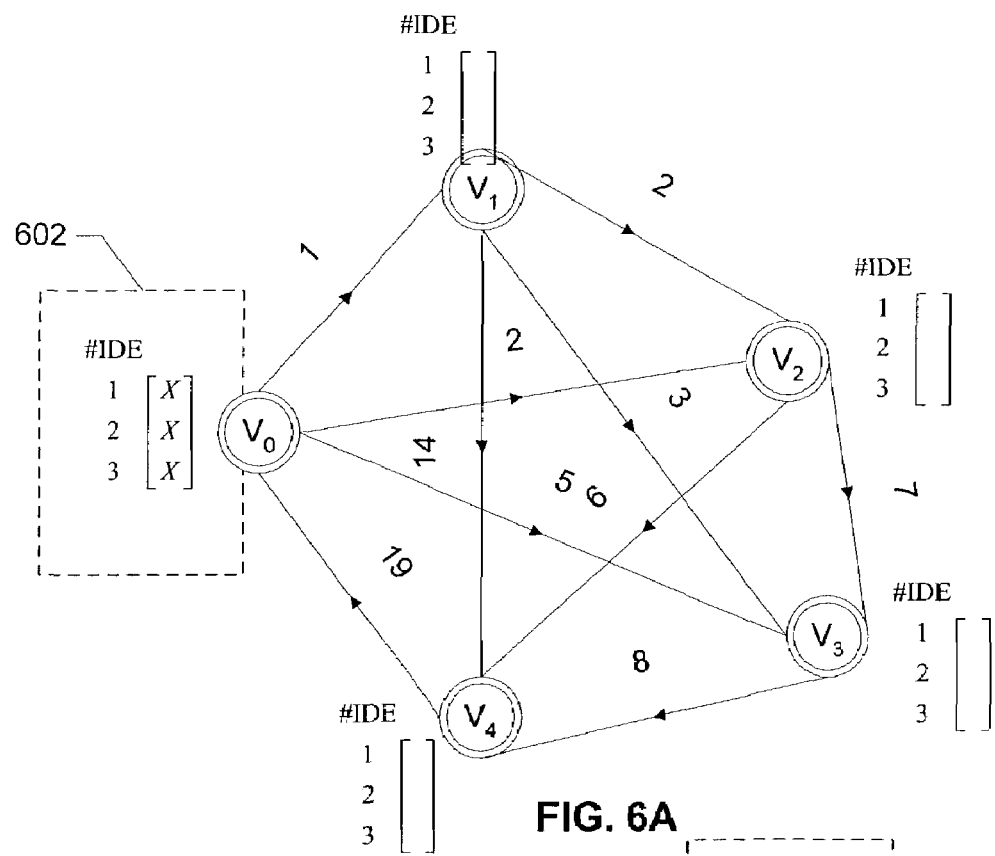
FIG. 6A through 6E are schematic diagrams of a directed graph representing various shards in a storage volume and processed in accordance with implementations of the present invention.

Referring to FIG. 6A, the directed graph reflects the state of the directed graph and weight vectors upon the first iteration of processing in accordance with the present invention. In this example, the directed graph has five vertices and ten directed edges namely $V_0$, $V_1$, $V_2$, $V_3$, $V_4$, and $V_0V_1$, $V_1V_2$, $V_2V_3$, $V_3V_4$, $V_0V_4$, $V_0V_2$, $V_0V_3$, $V_1V_4$, $V_1V_3$, $V_2V_4$ respectively. Weight vector 602 for vertex $V_0$ is initialized to have K "X" entries. This is because there is not even one directed edge to the $V_0$ vertex.

Figure 6B:
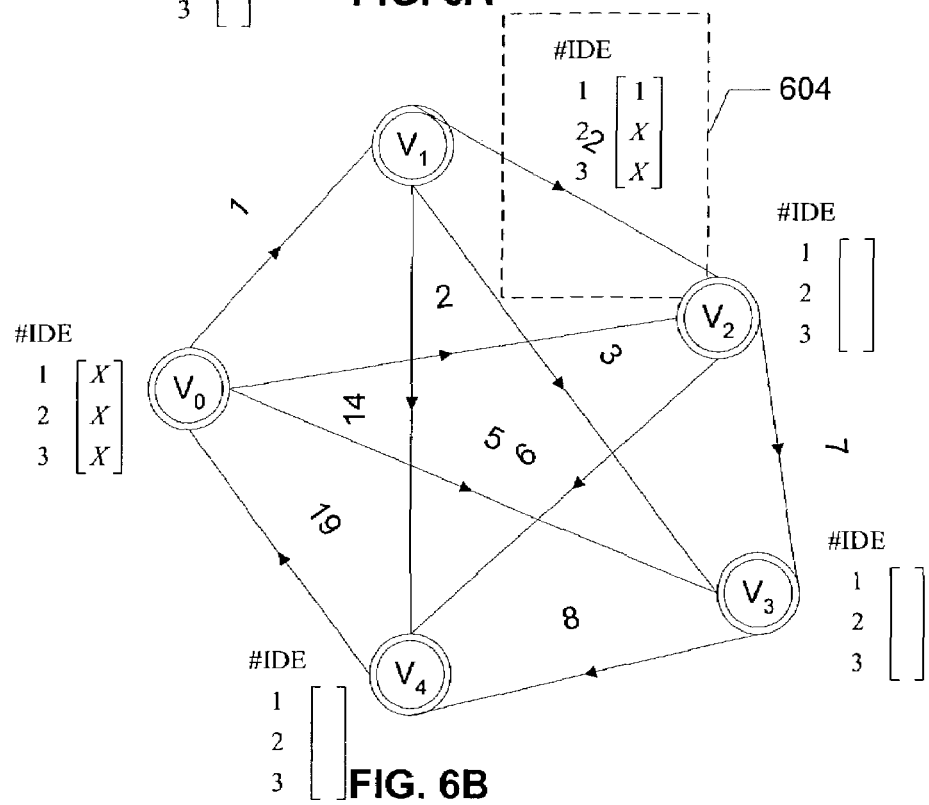

FIG. 6B illustrates processing of the weight vector associated with vertex $V_1$ of the directed graph on the second iteration in accordance with one implementation of the present invention. Here, $V_1$ vertex has only one directed edge so the $1^{st}$ entry in the corresponding weight vector 604 has the weight of this directed edge and the other remaining entries are given the "X" entry. The $2^{nd}$ and $3^{rd}$ weight vectors are given the "X" entry as there is not a sequence of 2 or 3 directed edges from the initial vertex $V_0$ to the current vertex $V_1$.

Figure 6C:
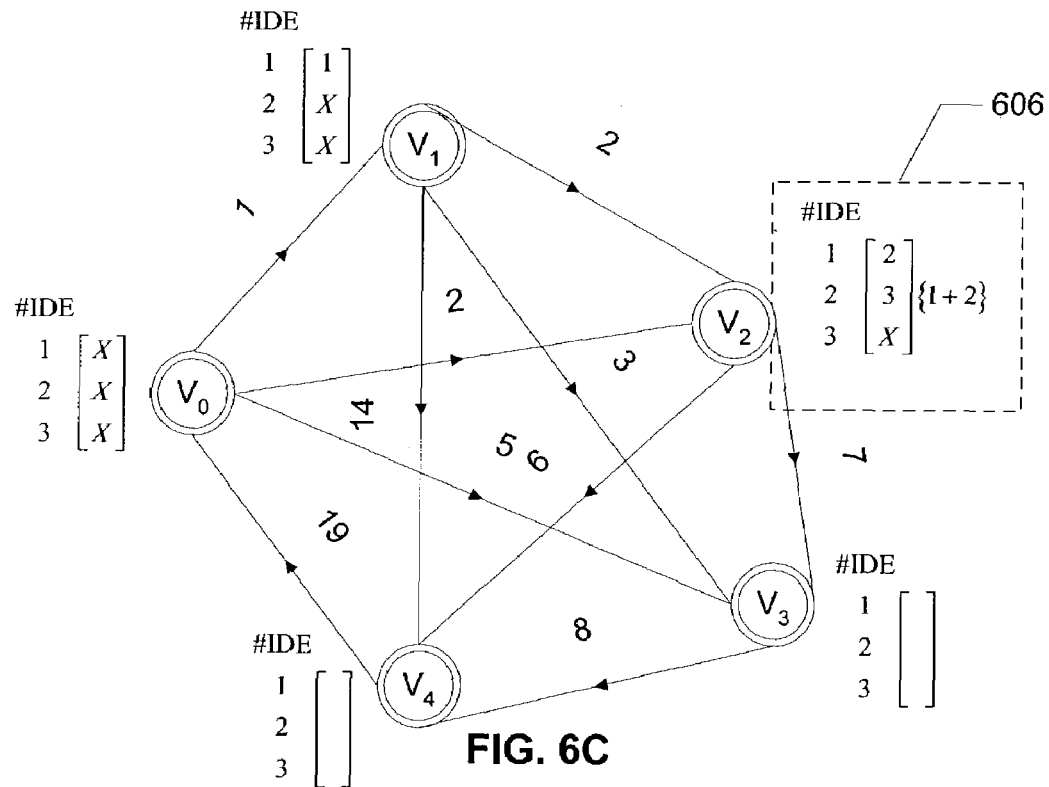

FIG. 6C illustrates processing of the weight vector associated with vertex $V_2$ of the directed graph on the third iteration in accordance with one implementation of the present invention. In this iteration, the first two entries in weight vector 606 are provided numeric values and the $3^{rd}$ entry is given the "X" entry. The $1^{st}$ entry in the weight vector is 2 because the weight associated with the one directed edge is 2 and there are no other single directed edge between the initial vertex $V_0$ and the current vertex $V_2$. However, the second entry in the weight vector has a value of 3 since it is a combination of two directed edge weighted 1 and 2 between the initial vertex $V_0$ and the vertex $V_2$. The $3^{rd}$ entry in the weight vector is given an "X" entry because there is not a combination of 3 directed edge between the initial vertex $V_0$ and the vertex $V_2$.

Figure 6D:
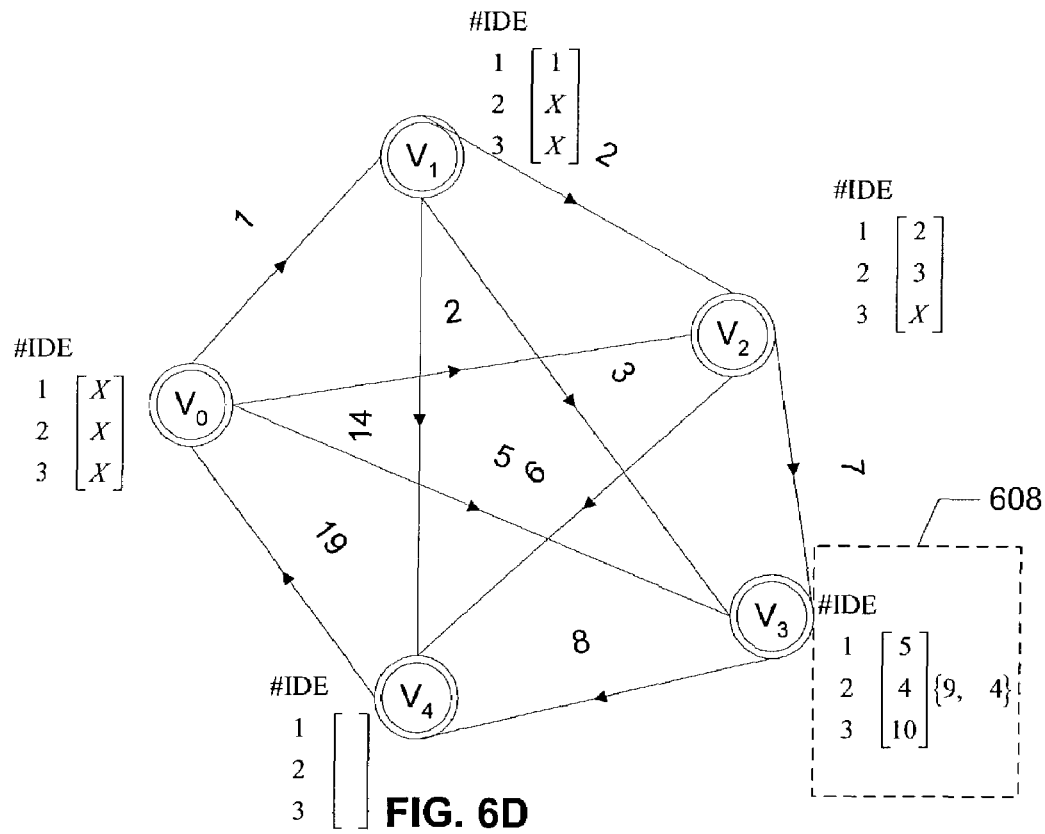

FIG. 6D illustrates processing of the weight vector associated with vertex $V_3$ of the directed graph on the fourth iteration in accordance with one implementation of the present invention. In this example, all three entries in weight vector 608 for vertex $V_3$ receive numeric values. Unlike the other examples, this weight vector has two potential entries to evaluate and enter into the $2^{nd}$ entry: a weight of 9 and a lower weight of 4.

The two potential entries arise in this example because there are two different pairs of directed edges that span between vertex $V_0$ and vertex $V_3$; this means there are two potential shardings of the storage volume that need to be evaluated at this juncture. The first potential shard combines the weight value of 7 associated with the preceding directed edge $V_2V_3$ with the weight value of 2 in the first vector entry for the neighbor vertex $V_2$. However, the first shard is not selected as the corresponding weight of 7 is greater than the weight value of 4 from the second potential shard. Specifically, the second shard weight is derived from the preceding directed edge $V_1V_3$ having a weight value of 3 and the first entry in the weight vector associated with the neighbor vertex $V_1$ having a weight value of 1.

Figure 6E:
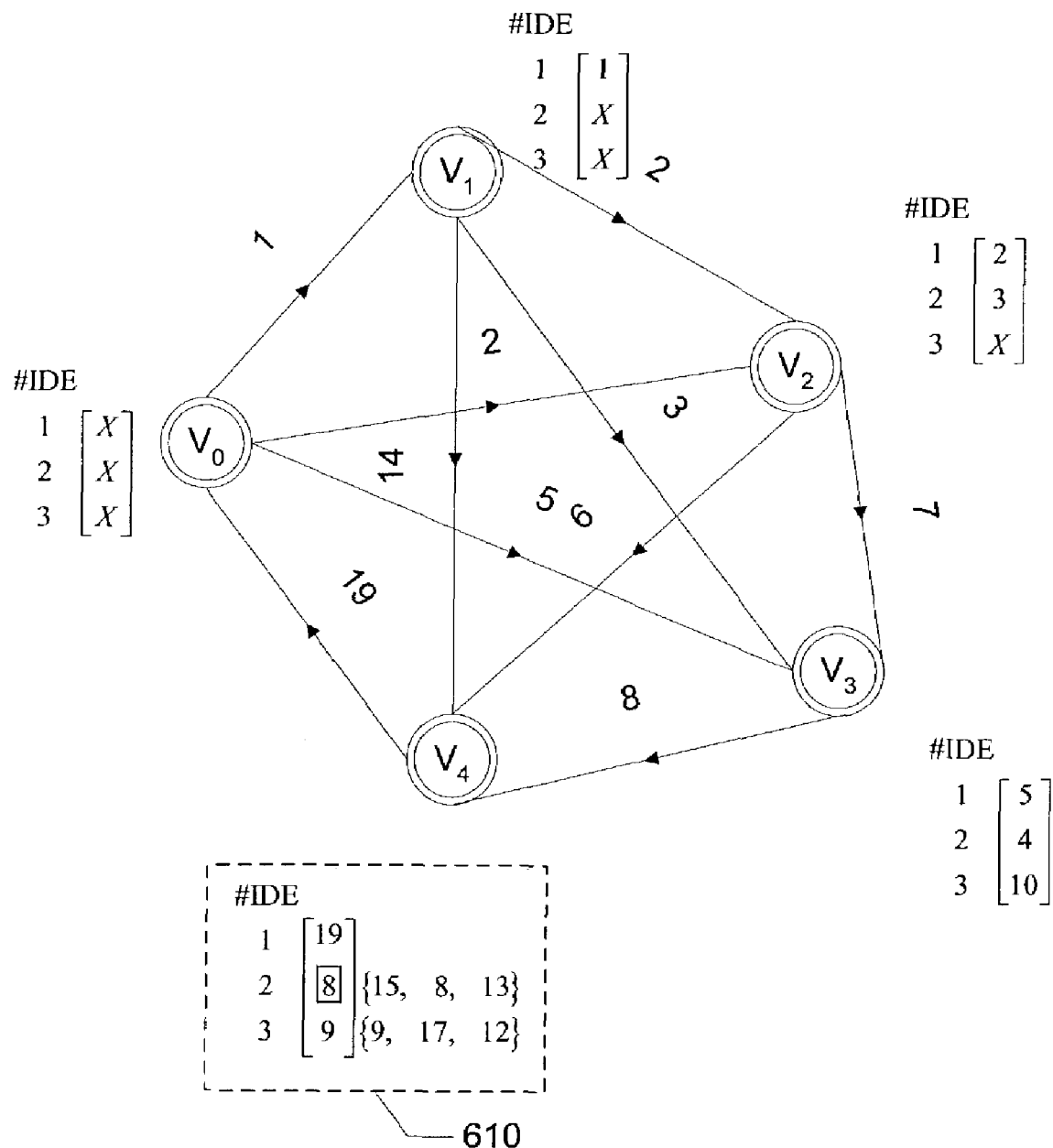

FIG. 6E illustrates processing of the weight vector associated with vertex $V_4$ of the directed graph on the fifth iteration in accordance with one implementation of the present invention. Similar to the weight vector associated with vertex $V_3$, weight vector 610 presents 3 possible shards to consider when dividing the storage volume into either 2 or 3 divisions. If the storage volume is divided into 2 shards, the possible weights associated with these different 2 shard combinations include 15, 8, and 13 while dividing the storage volume into 3 shards results in possible weights of 9, 17, and 12. Dividing the storage volume into a single shard provides only one shard having a weight of 19. In accordance with the present invention, the weight vector is selected to include only the values representing a minimum dissimilarity among the blocks; this weight vector associated with vertex $V_4$ includes 19, 8, and 9 weight entries. Ultimately, the sharding corresponding to a weight of 8 is selected as it represents the sharding with the least dissimilarity for the storage volume. Reverse tracing the directed edges associated with these weights produces a sharding that divides the storage volume into blocks B1, B2 for a first shard and blocks B3 and B4 for the second shard.

Figure 7:
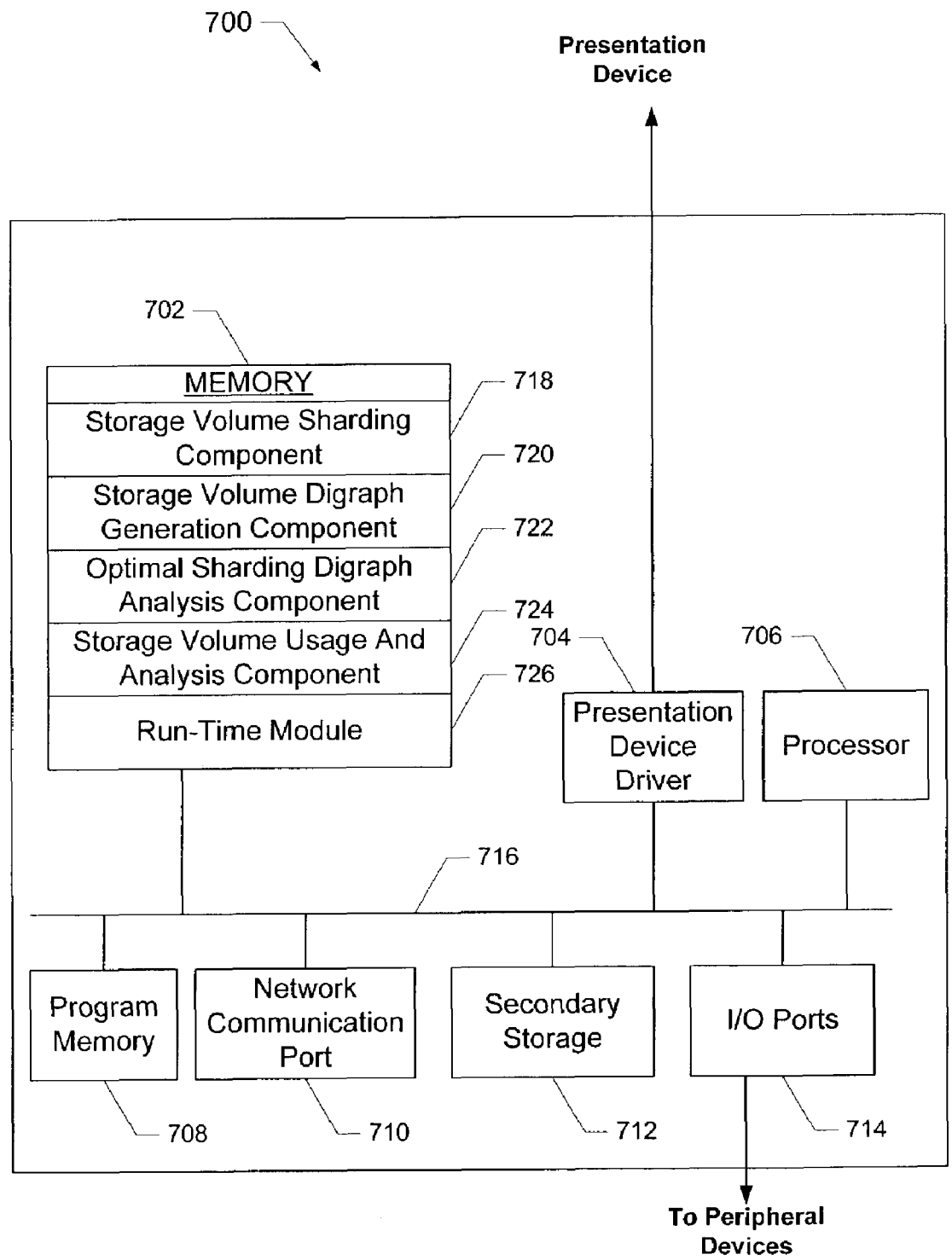
FIG. 7 is a block diagram of a system used in one implementation for performing the apparatus or methods of the present invention.

FIG. 7 is a block diagram of a system 700 used in one implementation for performing the apparatus or methods of the present invention. System 700 includes a memory 702 to hold executing programs (typically random access memory (RAM) or writable read-only memory (ROM) such as a flash ROM), a presentation device driver 804 capable of interfacing and driving a display or output device, a program memory 708 for holding drivers or other frequently used programs, a network communication port 710 for data communication, a secondary storage 712 with secondary storage controller, and input/output (I/O) ports 714 also with I/O controller operatively coupled together over a bus 716. The system 700 can be preprogrammed, in ROM, for example, using field-programmable gate array (FPGA) technology or it can be programmed (and reprogrammed) by loading a program from another source (for example, from a floppy disk, a CD-ROM, or another computer). Also, system 700 can be implemented using customized application specific integrated circuits (ASICs).

In one implementation, memory 702 includes a storage volume sharding component 718, a storage volume digraph generation component 720, an optimal sharding digraph analysis component 722, a storage volume usage and analysis component 724, and a run-time module that manages system resources used when processing one or more of the above components on system 700.

Storage volume sharding component 718 is designed to divide a given storage volume in one or more shards in accordance with the present invention. Storage volume digraph selection component 720 maps an optimal sharding problem onto the directed graph for solving. Once the directed graph has been created, optimal sharding diagraph analysis component 722 determines the optimal sharding for the storage volume by analyzing the digraph according to the present invention. Storage volume usage and analysis component 724 collects information on access to a storage volume and provides statistical information to other components of the system as illustrated and described previously.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of dividing a storage volume into shards, comprising:
   creating a directed graph having a vertex for each block in the storage volume and directed-edges between pairs of vertices representing a shard of blocks;
   associating a weight with each directed edge that represents the dissimilarity for the shard of blocks between the corresponding pair of vertices;
   selecting a maximum number of shards (K) for dividing the storage volume;
   identifying a minimum aggregate weight associated with a current vertex for a combination of no more than K shards;
   performing the identification of the minimum aggregate weight for all vertices in the directed graph; and
   picking the smallest aggregated weight associated with the last vertex to determine a sharding that spans the storage volume and provides a minimal dissimilarity among no more than K shards of blocks.

2. The method of claim 1 wherein the pairs of vertices represents every permutation of blocks combined in sequence and the corresponding different shards of blocks.

3. The method of claim 1 wherein the dissimilarity for a shard having two or more blocks is determined by combining the pair wise dissimilarity measurement between pairs of blocks in the shard.

4. The method of claim 3 wherein the pair wise dissimilarity further comprises:
   monitoring storage access activity in an area of storage space;
   measuring at least one characteristic of the storage access activity of a plurality of individual portions of the area of storage space according to a predetermined parameter; and
   determining whether the characteristic of storage access activity of one individual portion is similar to that of another portion according to predetermined criteria.

5. The method of claim 4 wherein the predetermined criteria to determine the characteristic of storage access activity to that of another portion includes comparing the I/O size measurement of the each portion.

6. The method of claim 4 wherein the predetermined criteria to determine the characteristic of storage access activity to that of another portion includes comparing the read/write ratio of the each portion.

7. The method of claim 4 wherein the predetermined criteria to determine the characteristic of storage access activity to that of another portion includes comparing the I/O density of the each portion.

8. The method of claim 1 wherein selecting the maximum number of shards (K) improves overall efficiency of accessing data on the storage volume.

9. The method of claim 8 wherein the maximum number of shards (K) corresponds to the number of physical drives in the storage volume.

10. The method of claim 8 wherein the maximum number of shards (K) corresponds to the number of different access patterns within the storage volume.

11. The method of claim 1 wherein the minimum aggregate weight is determined by combining a weight from an immediately preceding directed edge with a minimum weight associated with a neighboring vertex.

12. A method of mapping shards in a storage volume to a directed graph for analysis, comprising:
identifying potential shards in the storage volume;
creating vertices and directed edges between pairs of the vertices in the directed graph for each potential shard in the storage volume; and
associating a weight to each directed edge to represent the dissimilarty of the sequence of blocks corresponding to the directed edge.

13. The method of claim 12 wherein potential shards in the storage volume corresponds to a pair wise sequence of blocks spanning the storage volume.

14. The method of claim 12 wherein an edge represents the sequence of blocks between the corresponding pair of vertices.

15. A computer program product for dividing a storage volume into shards, tangibly stored on a computer-readable medium, comprising instructions operable to cause a programmable processor to:
create a directed graph having a vertex for each block in the storage volume and directed-edges between pairs of vertices representing a shard of blocks;
associate a weight with each directed edge that represents the dissimilarity for the shard of blocks between the corresponding pair of vertices;
select a maximum number of shards (K) for dividing the storage volume;
identify a minimum aggregate weight associated with a current vertex for a combination of no more than K shards;
perform the identification of the minimum aggregate weight for vertices in the directed graph; and
pick the smallest aggregated weight associated with the last vertex to determine a sharding that spans the storage volume and provides a minimal dissimilarity among no more than K shards of blocks.

16. A computer program product for mapping shards in a storage volume to a directed graph for analysis, tangibly stored on a computer-readable medium, comprising instructions operable to cause a programmable processor to:
identify potential shards in the storage volume;
create vertices and directed edges between pairs of the vertices in the directed graph for each potential shard in the storage volume; and
associate a weight to each directed edge to represent the dissimilarity of the sequence of blocks corresponding to the directed edge.

17. An apparatus that divides a storage volume into shards comprising:
a processor;
a memory having instructions capable of being executed on the processor that create a directed graph having a vertex for each block in the storage volume and directed-edges between pairs of vertices representing a shard of blocks, associated a weight with each directed edge that represents the dissimilarity for the shard of blocks between the corresponding pair of vertices, select a maximum number of shards (K) for dividing the storage volume, identify a minimum aggregate weight associated with a current vertex for a combination of no more than K shards, perform the identification of the minimum aggregate weight for vertices in the directed graph, and picks the smallest aggregated weight associated with the last vertex to determine a sharding that spans the storage volume and provides a minimal dissimilarity among no more than K shards of blocks.

18. An apparatus that maps shards in a storage volume to a directed graph for analysis, comprising:
a processor;
a memory having instructions capable of being executed on the processor that identifies potential shards in the storage volume, creates vertices and directed edges between pairs of the vertices in the directed graph for each potential shard in the storage volume, associates a weight to each directed edge to represent the dissimilarity of the sequence of blocks corresponding to the directed edge.

19. An apparatus for dividing a storage volume into shards, comprising:
means for creating a directed graph having a vertex for each block in the storage volume and directed-edges between pairs of vertices representing a shard of blocks;
means for associating a weight with each directed edge that represents the dissimilarity for the shard of blocks between the corresponding pair of vertices;
means for selecting a maximum number of shards (K) for dividing the storage volume;
means for identifying a minimum aggregate weight associated with a current vertex for a combination of no more than K shards;
means for performing the identification of the minimum aggregate weight for vertices in the directed graph; and
means for picking the smallest aggregated weight associated with the last vertex to determine a sharding that spans the storage volume and provides a minimal dissimilarity among no more than K shards of blocks.

20. An apparatus for mapping shards in a storage volume to a directed graph for analysis, comprising:
means for identifying potential shards in the storage volume;
means for creating vertices and directed edges between pairs of the vertices in the directed graph for each potential shard in the storage volume; and
means for associating a weight to each directed edge to represent the dissimilarity of the sequence of blocks corresponding to the directed edge.

* * * * *

UNITED STATES PATENT AND TRADEMARK OFFICE
CERTIFICATE OF CORRECTION

| | |
|---|---|
| PATENT NO. | : 7,043,621 B2 |
| APPLICATION NO. | : 10/439977 |
| DATED | : May 9, 2006 |
| INVENTOR(S) | : Arif Merchant et al. |

It is certified that error appears in the above-identified patent and that said Letters Patent is hereby corrected as shown below:

In column 13, line 15, in Claim 12, delete "dissimilarty" and insert -- dissimilarity --, therefor.

Signed and Sealed this

Thirtieth Day of March, 2010

David J. Kappos
*Director of the United States Patent and Trademark Office*